UNITED STATES PATENT OFFICE.

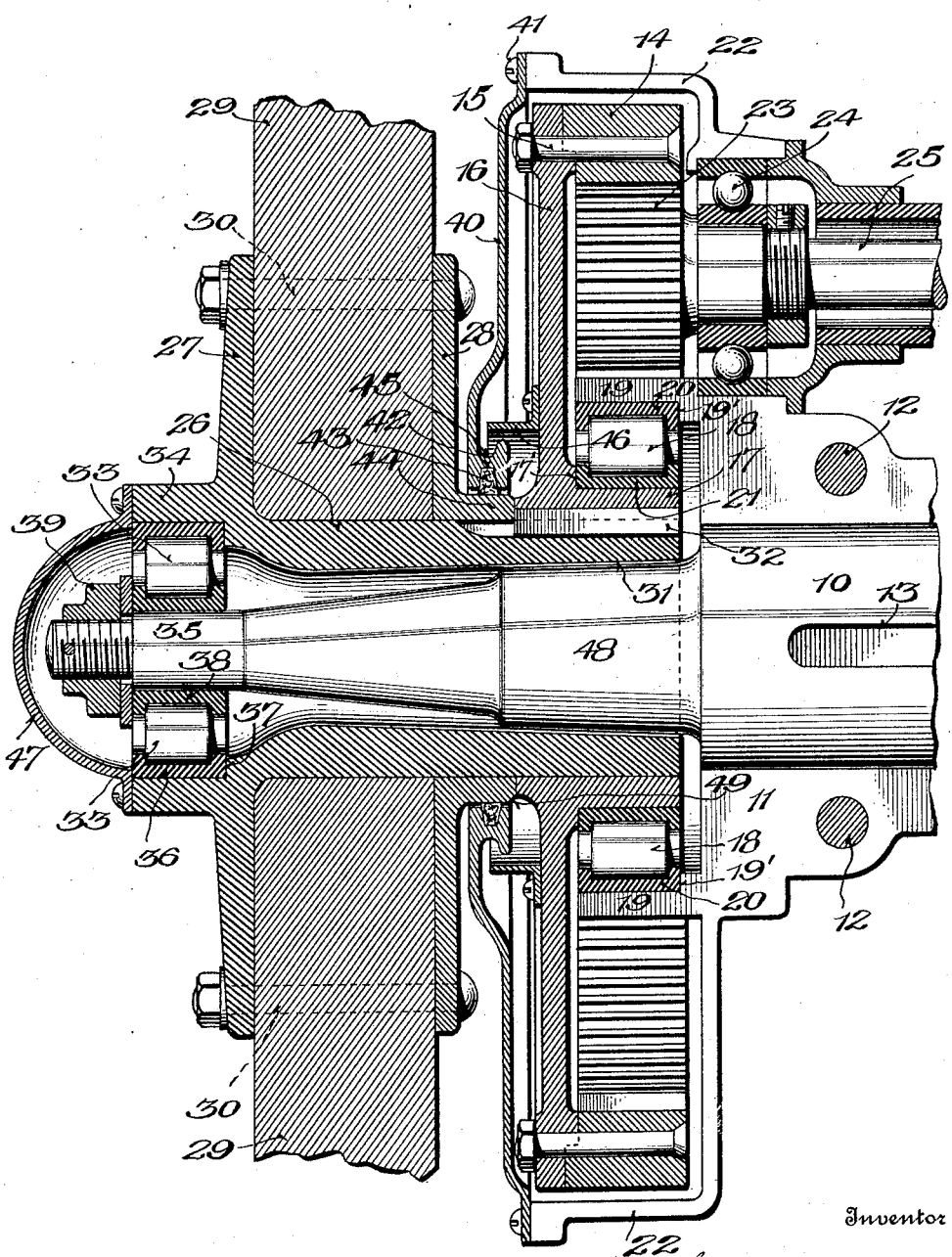

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,401,043.      Specification of Letters Patent.      Patented Dec. 20, 1921.

Application filed January 24, 1919. Serial No. 272,885.

*To all whom it may concern:*

Be it known that I, HAROLD D. CHURCH, a citizen of the United States, and resident of Detroit, Wayne county, State of Michigan, have invented certain new and useful Improvements in Motor-Vehicles, of which the following is a specification.

The present invention relates to motor vehicles and more particularly to an axle construction of the type having reduction gearing at the wheels. This type of axle is usually employed in motor trucks which necessarily have heavy road wheels. In the factory where the axles are made, the mounting of the wheels on the axles presents no great difficulty as the factory is equipped with the proper tools and apparatus to handle the wheels. Repair shops, however, as a rule do not have the necessary equipment to easily handle the wheels and, consequently, after a wheel has been taken off for repair or other purpose it has not been an easy matter to remount it.

One of the principal features of the present invention consists in the provision of an axle construction of the type mentioned in which the wheel may be assembled easily thereby overcoming the difficulty described above.

Another feature consists in the improved arrangement of bearings for supporting the wheel.

Another feature resides in the few parts employed and the simplicity of the construction, resulting in a low cost of manufacture and a rigid and dependable structure.

Other features and objects of the invention will be apparent from the drawing in which the single figure is a sectional plan view of one end of an axle constructed in accordance with the present invention.

Referring to the drawing, the numeral 10 indicates a non-revoluble axle, which preferably is continuous from wheel to wheel and has its ends formed with spindles disposed within the road wheelhubs. It is to be understood that the structure now to be described is duplicated at the other end of the axle.

A spring pad is disposed around the axle 10 and preferably is split, the numeral 11 indicating the lower half of this pad. The two parts of the spring pad are clamped on the axle and secured thereto against rotation as by means of the bolts 12 and a key disposed in the key way 13. This pad is constructed to revolubly support an internal gear which, as shown, comprises a ring 14 secured as by means of bolts 15 to a spider member 16 having a hub 17. This gear is rotatively supported on the spring pad by means of a roller bearing 18 disposed between the exterior of the hub 17 and a flange 19 preferably integral with the spring pad. The bearing 18 is preferably of the type which takes both radial and thrust load. As shown, the outer race ring 20 of this bearing is mounted in the flange 19 so that it is held against movement toward the right as viewed in the figure by the shoulder 19'. The inner race ring 21 is mounted on the hub 17 so that it is held against axial movement toward the left as viewed in the figure by the shoulder 17'. Consequently, this bearing acts to prevent axial movement of the gear toward the right as viewed in the figure. It is to be understood that the flange 19 is formed in two semicylindrical parts, a part to each section of the spring pad.

A casing surrounds two sides of the internal gear and as shown is preferably formed integral with the spring pad 11, it being understood that the casing consists of two sections 22. The internal gear is driven by means of a pinion 23 meshing therewith and rotatively supported by the bearing 24 in the casing 22. The pinion 23 is mounted on and driven by the shaft section 25, it being understood that this section is connected to a differential gearing in a well known manner.

The wheel which is driven by this gearing has a hub which is made up of a sleeve 26 having a radially projecting flange 27 near one end. A ring 28 surrounds the sleeve and the spokes 29 of the wheel are adapted to be clamped and held between the members 27 and 28 by means such as the bolts 30. At the inside of the wheel the hub is extended as at 31 and fitted within the hub 17 of the internal gear. These parts are secured for rotation together in any suitable manner as by means of the key 32. This arrangement makes the internal gear substantially rigid with the wheel hub and consequently the roller bearing 18 constitutes the inner bearing for the wheel hub. The outer bearing is shown at 33 and is disposed between a flange 34 on the sleeve 26 and the reduced end portion 35 of the axle spindle. The outer race ring 36 of this bearing is held against inward movement by the shoulder 37. The inner race ring 38 is held against outward movement on the spindle by the nut 39. The bearing 33, therefore, in addition to taking the radial load of the wheel also holds it against axial movement in one direction. Thus the bearing 33 holds the wheel against axial movement toward the left as viewed in the figure while the roller bearing 18 holds the wheel against axial movement toward the right as viewed in the figure.

The side of the casing 22 toward the road wheel is closed by a plate 40 fastened to the casing 22 by screws 41. The inner periphery of the plate 40 is formed with a groove 42 for the packing 43 which contacts with the outer periphery of the hub 44 formed on the ring 28. This packing prevents dirt from entering the gear casing and also oil and grease from leaking out on to the brake bands. To further prevent leaking of oil the plate 40 adjacent its inner periphery is formed with the internally disposed groove 45 which coöperates with the ring 46 on the spider 16.

In order to disassamble this construction the cap 47 at the outside of the wheel is removed and then the nut 39. A wheel puller is then applied to the wheel and the wheel drawn off from the axle, the hub extension 31 being withdrawn from the interior of the gear hub 17. The wheel may now be repaired, and if it is desired to obtain access to the gearing this is easily accomplished by removing the plate 40.

As previously mentioned, heretofore it has been difficult to remount a wheel which has been taken off from an axle of the type described herein. To overcome this difficulty according to the present invention, the spindle on the end of the axle is formed with a guiding portion 48 which is of a size such that its surface is just out of contact with the interior surface of the hub extension 31 when the wheel is properly mounted. It will be apparent, therefore, when remounting the wheel that this section 48 will operate to guide the extension 31 into the hub 17 of the gear. Preferably, this section 48 is substantially cylindrical, but its size is such that while it forms a guide for remounting the wheel, yet it is out of contact with the hub when the wheel is in operation. In order that the hub 44 may enter within the packing 43, its entering edge 49 is preferably beveled.

Although a specific embodiment of the invention has been described in detail, it is to be understood that the invention is not thus limited but includes modifications and changes which come within the scope of the appended claims.

Having thus described the invention what is claimed as new and desired to be secured by Letters Patent is:—

1. A motor vehicle axle construction including in combination, an axle, a casing secured to the axle, a gear within the casing having a hub formed with a bore, a bearing between the gear and casing rotatably supporting the gear, a driving pinion associated with said gear, and a ground wheel having a hub projecting at one side thereof, said wheel hub being of smaller diameter than said bearing, said wheel hub being disposed within the bore of the gear hub for rotation with the latter.

2. A motor vehicle axle construction including in combination, a non-revoluble axle, a wheel having a hub projecting from one side, a gear having a hub mounted on the wheel hub for rotation therewith, a casing secured to the axle surrounding said gear, a driving pinion meshing with said gear and rotatably carried by said casing, and means rotatably supporting the wheel hub including a roller bearing disposed between the said gear hub and the casing, said gear hub being of smaller diameter than the bearing.

3. A motor vehicle axle construction, including in combination, a non-revoluble axle, a casing secured to the axle, a gear within the casing rotatably carried thereby, a driving pinion meshing with the gear rotatably carried by the casing, a wheel having a projecting hub disposed within the bore of said gear and secured thereto for rotation therewith, and means on the axle to guide the hub into the bore when mounting the wheel.

4. A motor vehicle axle construction including in combination, a non-revoluble axle, a casing secured to the axle, a gear within the casing rotatably carried thereby, a driving pinion meshing with the gear rotatably carried by the casing, a wheel having a projecting hub disposed within the bore of said gear and secured thereto for rotation therewith, a circular flange on the interior of the casing spaced from said gear hub, and a roller bearing between said flange and hub.

5. A motor vehicle axle construction including in combination, a non-revoluble axle, a casing secured to the axle, a gear within the casing rotatably carried thereby, a driving pinion meshing with the gear rotatably carried by the casing, a wheel having a projecting hub disposed within the bore of said gear and secured thereto for rotation therewith, a circular flange on the interior of the casing spaced from said gear hub, a roller bearing between said flange and hub, and means on the axle to guide the hub into the bore when mounting the wheel.

6. A motor vehicle axle construction comprising in combination, an axle, a wheel at the end of the axle having a hub projecting at one side thereof, a non-revoluble casing surrounding said hub, means rotatably supporting the wheel including a roller bearing disposed between said casing and the exterior of said hub and a driving gear in said casing surrounding said hub and removably secured thereto.

7. A motor vehicle axle construction comprising in combination, a non-revoluble axle, a wheel at one end thereof having a hub projecting from one side, a casing secured to the axle having a circular flange surrounding said hub, a roller bearing between said hub and flange, a gear within said casing disposed in the same transverse region as said bearing and a second roller bearing at the other side of the wheel disposed between the axle and hub.

8. A motor vehicle axle construction including in combination, a non-revoluble axle having a spindle at one end thereof, a casing secured to the axle, a gear rotatably supported in said casing, and a wheel surrounding said spindle having a hub projecting at one side fitting within the hub of said gear, said spindle formed to guide the wheel hub into the gear hub when mounting the wheel.

9. A motor vehicle axle construction including in combination, a non-revoluble axle having a spindle at one end thereof, a casing secured to the axle, a gear rotatably supported in said casing, and a wheel surrounding said spindle having a hub projecting at one side fitted within the hub of said gear, said spindle being tapered and having a substantially cylindrical portion in the same transverse region as the gear hub, said portion being just out of contact with the interior of the bore of the wheel hub, whereby the wheel hub is guided by the spindle into the gear hub when mounting the wheel.

10. A motor vehicle axle construction including in combination, a non-revoluble axle, a spring pad secured to the axle, a ground wheel having a hub, a driving gear disposed between the pad and wheel, and means rotatably supporting the wheel including a roller bearing between the wheel and axle disposed at the outer side of the wheel and a roller bearing at the inner side of the wheel surrounding its hub and carried by said pad.

11. A motor vehicle axle construction including in combination, a non-revoluble axle, a ground wheel having a hub, a spring pad secured to the axle having an annular flange disposed between said pad and wheel surrounding said hub, and means rotatably supporting the wheel including a roller bearing at the inner side of the wheel surrounding its hub and carried by said flange.

12. A motor vehicle axle construction including in combination, a non-revoluble member, a road wheel at the end of said member having a hub, a spring pad disposed inside the inner end of said hub and secured to the member, a casing associated with said pad, a gear within said casing connected to said wheel for the removal of the latter without disturbing said casing, means rotatively supporting the wheel and gear including a roller bearing surrounding the wheel hub and carried by said pad, and means to drive said gear.

13. A motor vehicle axle construction including in combination, a non-revoluble member, a road wheel at the end of said member having a hub, a spring pad secured to the member, an annular flange and a casing carried by said pad, a gear within said casing connected to said wheel, means rotatively supporting the wheel and gear including a roller bearing substantially in the plane of the gear surrounding the hub and carried by said flange, and means to drive said gear.

14. A motor vehicle axle construction including in combination, a non-revoluble member, a road wheel having a hub projecting at its inner side, a spring pad disposed inside the inner end of the wheel hub and secured to said member, and means rotatably supporting the wheel including a roller bearing carried by the pad and surrounding the projecting part of the hub, and a roller bearing at the opposite side of the wheel.

In testimony whereof I affix my signature.

HAROLD D. CHURCH.